(12) United States Patent
Koga et al.

(10) Patent No.: US 11,809,154 B2
(45) Date of Patent: Nov. 7, 2023

(54) MULTI-AXIS CONTROL ADJUSTMENT APPARATUS, MULTI-AXIS CONTROL ADJUSTMENT SYSTEM, AND MULTI-AXIS CONTROL ADJUSTMENT METHOD

(71) Applicant: KABUSHIKI KAISHA YASKAWA DENKI, Kitakyushu (JP)

(72) Inventors: Minoru Koga, Kitakyushu (JP); Isamu Matsumura, Kitakyushu (JP); Junichi Watanabe, Kitakyushu (JP); Toshinobu Kira, Kitakyushu (JP); Tetsuya Asai, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 127 days.

(21) Appl. No.: 17/528,201

(22) Filed: Nov. 17, 2021

(65) Prior Publication Data
US 2022/0197240 A1    Jun. 23, 2022

(30) Foreign Application Priority Data

Dec. 17, 2020    (JP) .................................. 2020-209694

(51) Int. Cl.
*G05B 19/29*    (2006.01)
(52) U.S. Cl.
CPC .. *G05B 19/291* (2013.01); *G05B 2219/34013* (2013.01)
(58) Field of Classification Search
CPC ........ G05B 19/291; G05B 2219/34013; G05B 19/409; G05B 2219/50218; G05B 19/4083; G05B 13/042; G05D 3/12
(Continued)

(56) References Cited

U.S. PATENT DOCUMENTS 8,334,669 B2 * 12/2012 Nagato .............. G05B 19/4141
318/560
10,173,322 B2 * 1/2019 Chiu ........................ H02P 8/22
(Continued)

FOREIGN PATENT DOCUMENTS

JP      04-321105      11/1992
JP      2007-172156     7/2007
(Continued)

OTHER PUBLICATIONS

Extended European Search Report for corresponding EP Application No. 21208155.8-1205, dated Apr. 21, 2022.
(Continued)

*Primary Examiner* — David Luo
(74) *Attorney, Agent, or Firm* — MORI & WARD, LLP

(57) ABSTRACT

A multi-axis control adjustment apparatus includes adjustment axis selection circuitry configured to select a plurality of target axes among a plurality of axes each of which represents a combination of a motor and a motor control device configured to control the motor according to a control parameter of the motor control device, adjustment operation execution circuitry configured to perform adjustment operations in each of which the control parameter is adjusted with respect to each of the plurality of target axes, and first control parameter setting circuitry configured to change, according to the adjustment operations, timing at which the control parameter is set with respect to each of the plurality of target axes.

16 Claims, 9 Drawing Sheets

(58) Field of Classification Search
USPC .......................... 318/574, 570, 569, 567, 560
See application file for complete search history.

(56) References Cited

U.S. PATENT DOCUMENTS

| | | |
|---|---|---|
| 10,365,634 B2 * | 7/2019 | Wakana ............... G05B 19/409 |
| 2016/0231730 A1 | 8/2016 | Wakana |
| 2019/0121313 A1 | 4/2019 | Okura et al. |

FOREIGN PATENT DOCUMENTS

| | | |
|---|---|---|
| JP | 2008-102714 | 5/2008 |
| JP | 5523643 B1 | 6/2014 |
| WO | WO 2017/195578 | 11/2017 |

OTHER PUBLICATIONS

Japanese Office Action for corresponding JP Application No. 2020-209694, dated Feb. 8, 2022 (w/ English machine translation).
Japanese Office Action for corresponding JP Application No. 2020-209694, dated Mar. 11, 2022 (w/ English machine translation).

* cited by examiner

FIG. 5

Adjustment Axis Selection · Detailed Setting Screen

Adjustment Axis Selection

Select an axis on which automatic adjustment is simultaneously performed

| Axis | 67 / 69 |
|---|---|
| AXIS001A | ✓ |
| AXIS001B | ✓ |
| AXIS002A | |
| AXIS003A | |
| AXIS004A | ✓ |

Detailed Setting

For axis being checked on "Set to the Same Value", adjustment results are all the same. (73)

| Axis | Detailed Setting | Set to the Same Value |
|---|---|---|
| AXIS001A | [Setting] ~75 | ✓ |
| AXIS001B | [Setting] ~75 | ✓ |
| AXIS004A | [Setting] ~75 | |

71 →

Setting Pattern

| 1 : Operating with same gain setting at all times during adjustment operation | ~77 |

Setting condition by "Set Collectively" is reflected to all axes.

[Set Collectively] ~79

[Close Detailed Setting] ~81

FIG. 6

| Item | First Adjustment Pattern | Second Adjustment Pattern |
|---|---|---|
| Summary | Same parameter setting at all times during adjustment operation | Perform indivisual adjustment during adjustment operation, and set final setting value to same parameter for all axes |
| Gain Searching Process | Adjustment Apparatus | Servo Amplifier |
| Process related to Vibration Suppression | Servo Amplifier | Servo Amplifier |
| Inertia Setting Value | Individual | Individual |
| Final Setting Process | Adjustment Apparatus | Adjustment Apparatus |
| Superordinate Command | Same For All Axes | Individual |
| Example of Application Device | Gantry Mechanism — Device which is strongly mechanically constrained between the axes and operate by the same command | XY Stage Mechanism — Device which is not strongly mechanically constraint between the axes and operate by a different command, wherein final setting of parameters is set to the same value |

MULTI-AXIS CONTROL ADJUSTMENT APPARATUS, MULTI-AXIS CONTROL ADJUSTMENT SYSTEM, AND MULTI-AXIS CONTROL ADJUSTMENT METHOD

CROSS-REFERENCE TO RELATED APPLICATIONS

The present application claims priority under 35 U.S.C. § 119 to Japanese Patent Application No. 2020-209694, filed Dec. 17, 2020. The contents of this application are incorporated herein by reference in their entirety.

BACKGROUND OF THE INVENTION

Technical Field

The disclosed embodiments relate to a multi-axis control adjustment apparatus, a multi-axis control adjustment system, and a multi-axis control adjustment method.

Background Art

Japanese Patent No. 5523643 discloses a multi-axis control system setting/adjusting function support device. The multi-axis control system setting/adjusting function support device has a setting/adjusting function for setting/adjusting a control parameter to be set in a servo amplifier for a multi-axis control system having a plurality of axes each representing a combination of one servo amplifier and one servo motor and performing positioning control by synchronizing the plurality of axes by a command of a motion controller, groups the plurality of axes constituting a mechanical axis in which the plurality of axes are mechanically coupled as one group, adjusts the control parameters for the plurality of axes constituting the group, and displays an average value of adjustment results of control parameters of all of the plurality of axes constituting the group for each item of the control parameter as a control parameter value of the machine axis.

SUMMARY OF THE INVENTION

According to one aspect of the present invention, a multi-axis control adjustment apparatus includes adjustment axis selection circuitry configured to select a plurality of target axes among a plurality of axes each of which represents a combination of a motor and a motor control device configured to control the motor according to a control parameter of the motor control device, adjustment operation execution circuitry configured to perform adjustment operations in each of which the control parameter is adjusted with respect to each of the plurality of target axes, and first control parameter setting circuitry configured to change, according to the adjustment operations, timing at which the control parameter is set with respect to each of the plurality of target axes.

According to another aspect of the present invention, a multi-axis control adjustment system includes the multi-axis control adjustment apparatus described above, and a multi-axis control system which includes the plurality of axes, and a host controller configured to synchronously control the plurality of axes.

According to further aspect of the present invention, a multi-axis control adjustment method includes selecting a plurality of target axes among a plurality of axes each of which represents a combination of a motor and a motor control device configured to control the motor according to a control parameter of the motor control device, performing adjustment operations in each of which the control parameter is adjusted with respect to each of the plurality of target axes, and changing, according to the adjustment operations, timing at which the control parameter is set with respect to each of the plurality of target axes.

DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a diagram illustrating an example of a selection screen for a user to select an adjustment pattern of a control parameter.

FIG. 6 is a table in which the contents of the first adjustment pattern and the contents of the second adjustment pattern are collated with each other.

DESCRIPTION OF EMBODIMENTS

Figure 1:
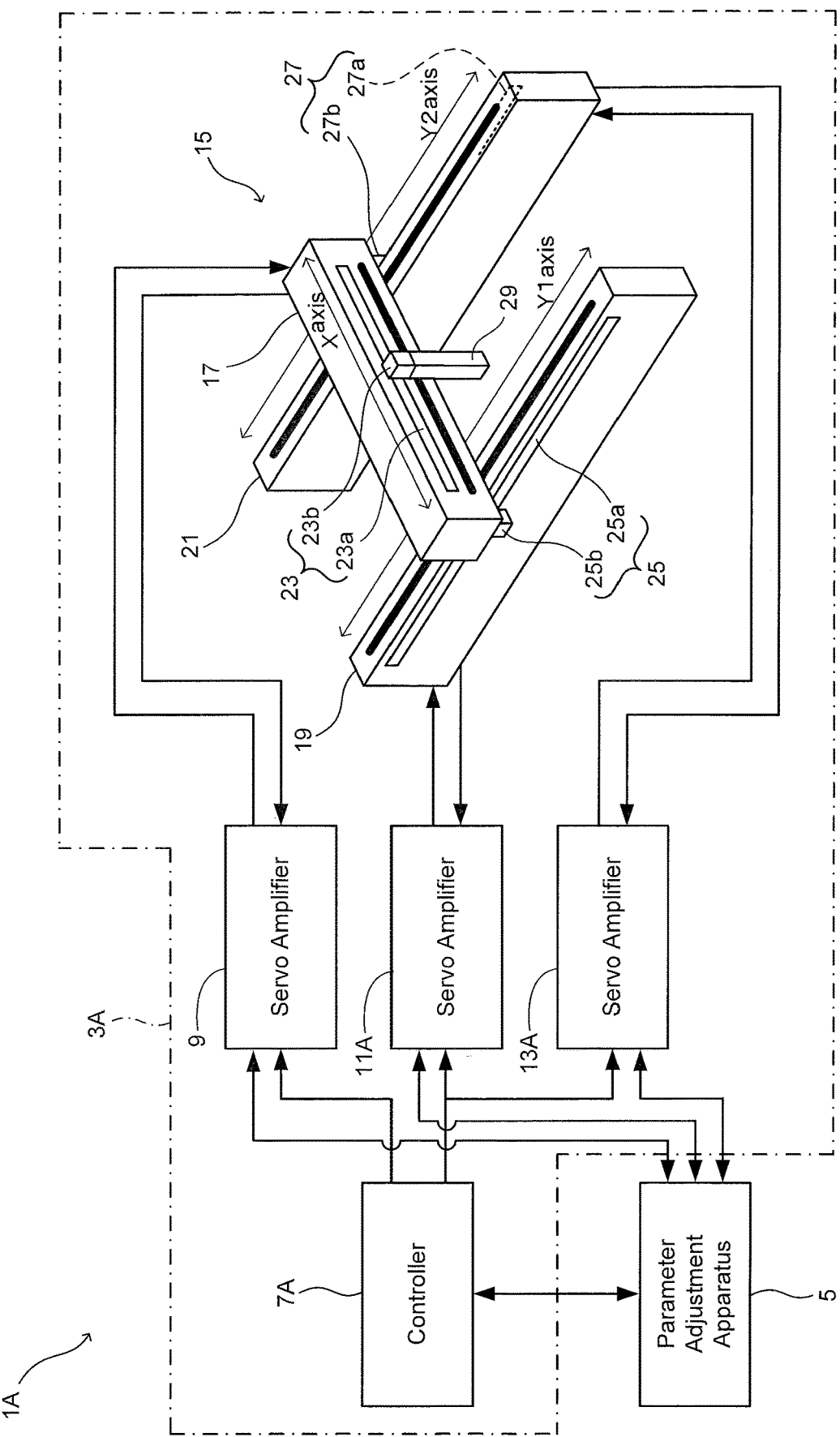
FIG. 1 is a diagram illustrating an example of a schematic configuration of a multi-axis control adjustment system in a case where two or more targets to be adjusted are mechanically constrained.

Hereinafter, an embodiment will be described with reference to the drawings.

1. Schematic Configuration of Multi-Axis Control Adjustment System

An example of a schematic configuration of a multi-axis control adjustment system including a multi-axis control adjustment apparatus according to the present embodiment will be described with reference to FIGS. 1 and 2.

The multi-axis control adjustment system 1 according to the present embodiment is a system for automatically adjusting control parameters of servo amplifiers for two or more axes that are targets to be adjusted by the multi-axis control system 3. The multi-axis control adjustment system 1 can adjust the control parameter both when the axis to be adjusted is mechanically constrained and when the axis to be adjusted is not mechanically constrained. Hereinafter, for convenience of description, the multi-axis control adjustment system when the axes to be adjusted are mechanically constrained is referred to as the multi-axis control adjustment system 1A, and the multi-axis control adjustment system when the axes to be adjusted are not mechanically constrained is referred to as the multi-axis control adjustment system 1B.

First, with reference to FIG. 1, the multi-axis control adjustment system 1A where two or more axes to be adjusted are mechanically constrained will be described with reference to FIG. 1. As shown in FIG. 1, the multi-axis control adjustment system 1A includes a multi-axis control system 3A and a parameter adjustment apparatus 5. The multi-axis control system 3A includes a controller 7A, three servo amplifiers 9, 11A and 13A, and a gantry mechanism 15. The multi-axis control system 3A has a plurality of axes (three axes in this example) each of which represents a combination of one servo amplifier and one linear motor, and controls the plurality of axes in synchronization with each other based on a command from the controller 7A.

The controller 7A (an example of a host controller) is a control device that controls the entire multi-axis control system 3A, and is also referred to as, for example, a host controller or a motion controller. The controller 7A transmits a position command to each of the servo amplifiers 9, 11A, and 13A.

The servo amplifiers 9, 11A, and 13A (an example of the motor control device) supply electric power to the linear motors included in the gantry mechanism 15 based on the position command received from the controller 7A to control the operation of the gantry mechanism 15. In the example shown in FIG. 1, the gantry mechanism 15 has, for example, three linear motors 17, 19, and 21, and three servo amplifiers 9, 11A, and 13A are provided so as to respective linear motors 17, 19, and 21.

The gantry mechanism 15 includes linear motors 19, and 21 arranged in parallel along the Y-axis direction, one linear motor 17 arranged along the X-axis direction so as to pass between the respective movers of the linear motors 19, and 21 in the form of a doubly supported beam, and an end effector 29. The axes of the servo amplifier 11A and the linear motor 19 and the axes of the servo amplifier 13A and the linear motor 21 are mechanically constrained. The linear motor 19 and the linear motor 21 are arranged such that linear movable ranges having substantially the same length are parallel to and overlap with each other in the Y-axis direction, and are controlled in synchronization with each other such that respective movers move at the same position in the Y-axis direction. The linear motor 17 moves as a whole in the Y-axis direction by driving of the linear motors 19, and 21, and moves the mover to which the end effector 29 is coupled in the X-axis direction.

Each of the three linear motors 17, 19, and 21 has a linear encoder 23, 25, and 27 for detecting the axial position of each movable element. The linear encoder 23 includes a linear scale 23a and a scale head 23b. The linear encoder 25 includes a linear scale 25a and a scale head 25b. The linear encoder 27 includes a linear scale 27a and a scale head 27b. The linear encoders 23, 25, and 27 detect the position of each movable element of the linear motors 17, 19, and 21 and transmits the detected position to the corresponding servo amplifiers 9, 11A, or 13A. The controller 7A transmits an X-axis position command to the servo amplifier 9, and transmits the same Y-axis position command to the servo amplifiers 11A and 13A. Each of the servo amplifiers 9, 11A, and 13A refers to the detected position received from the linear encoders 23, 25, and 27, and controls the supply power so that the position of the mover of the corresponding linear motors 17, 19, and 21 matches the position command. With the above configuration, the gantry mechanism 15 moves the position of the end effector 29 in the X-Y coordinates in response to the X-axis position command and the Y-axis position command transmitted by the controller 7A.

The parameter adjustment apparatus 5 (an example of the multi-axis control adjustment apparatus) automatically adjusts the control parameters of the servo amplifiers for the axes selected by the user among the plurality of axes of the multi-axis control system 3A. The parameter adjustment apparatus 5 is connected to the controller 7A so as to communicate with each of the servo amplifiers 9, 11A, and 13A. The parameter adjustment apparatus 5 may be, for example, a general-purpose personal computer or a specially designed engineering tool.

Next, with reference to FIG. 2, multi-axis control adjustment system 1B in a case where two or more axes to be adjusted are not mechanically constrained will be described. Note that "not mechanically constrained" includes not only a case where two or more shafts are not mechanically constrained but also a case where two or more axes are constrained but the constraint is weaker than that of the gantry mechanism 15 or the like. As shown in FIG. 2, the multi-axis control adjustment system 1B includes a multi-axis control system 3B and a parameter adjustment apparatus 5. The multi-axis control system 3B includes a controller 7B, two servo amplifiers 11B and 13B, and an XY stage mechanism 31. The multi-axis control system 3B has a plurality of axes (two axes in this example), each of which represents a combination of one servo amplifier and one linear motor, and synchronously controls the plurality of axes based on a command from the controller 7B.

The controller 7B (an example of a host controller) is a control device that controls the entire multi-axis control system 3B, and is also referred to as, for example, a host controller or a motion controller. The controller 7B transmits a position command to each of the servo amplifiers 11B and 13B.

The servo amplifiers 11B and 13B (an example of the motor control device) supply electric power to the linear motors included in the XY stage mechanism 31 based on the position command received from the controller 7B to control the operation of the XY stage mechanism 31. In the example shown in FIG. 2, the XY stage mechanism 31 has, for example, two linear motors 33, 35, and two servo amplifiers 11B and 13B are provided so as to linear motors 33, 35, respectively.

The XY stage mechanism 31 includes a linear motor 33 disposed along the X-axis direction, a linear motor 35 disposed along the Y-axis direction, and a movable table 37. The shafts formed by the servo amplifier 11B and the linear motor 33 and the shafts formed by the servo amplifier 13B and the linear motor 35 are mechanically connected to each other but are not restricted. The linear motors 33, 35 are arranged so as to be substantially orthogonal to each other. The linear motor 35 is connected to the mover of the linear motor 33, and the entire linear motor 33 moves in the X-axis direction by the driving of the linear motor 33. The movable table 37 is connected to a mover of the linear motor 35, and moves in the Y-axis direction by driving of the linear motor 35. The linear motors 33, 35 is synchronously controlled so that the movable table 37 moves to a desired position.

Each of the two linear motors 33, 35 has linear encoders 39, 41 for detecting the axial position of each movable element. The linear encoder 39 includes a linear scale 39a and a scale head 39b. The linear encoder 41 includes a linear scale 41a and a scale head 41b. The linear encoders 39, 41 detect the position of each movable element of the linear motors 33, 35 and transmit the detected position to the corresponding servo amplifier 11B or 13B. The controller 7B transmits an X-axis position command to the servo amplifier 11B and transmits a Y-axis position command to the servo amplifier 13B. Each of the servo amplifiers 11B and 13B refers to the detected position received from the linear encoders 39, 41, and controls the supply power so that the position of the movable element of the corresponding linear motors 33, 35 coincides with the position command With the above configuration, the XY stage mechanism 31 moves the position of the movable table 37 in the X-Y coordinates in response to the X-axis position command and the Y-axis position command transmitted by the controller 7B.

Figure 2:
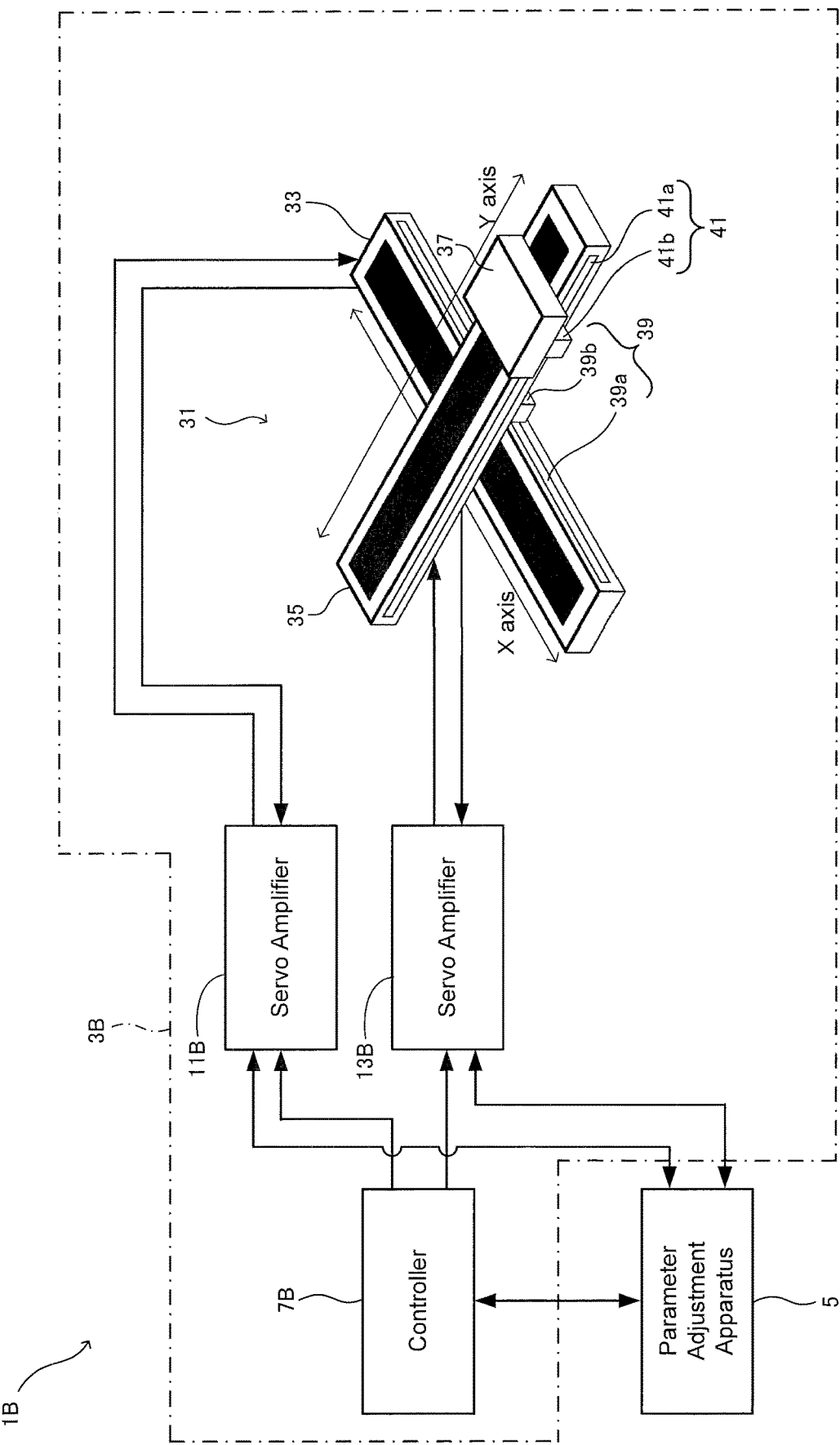
FIG. 2 is a diagram illustrating an example of a schematic configuration of a multi-axis control adjustment system in a case where two or more targets to be adjusted are not mechanically constrained.

The parameter adjustment apparatus 5 is the same as that shown in FIG. 1, and automatically adjusts the control parameters of the servo amplifiers for the axes selected by the user among the plurality of axes of the multi-axis control system 3B. The parameter adjustment apparatus 5 is connected to the controller 7B so as to communicate with each of the servo amplifiers 11B and 13B.

2. Configuration of Feedback Control System of Servo Amplifier

Figure 3:
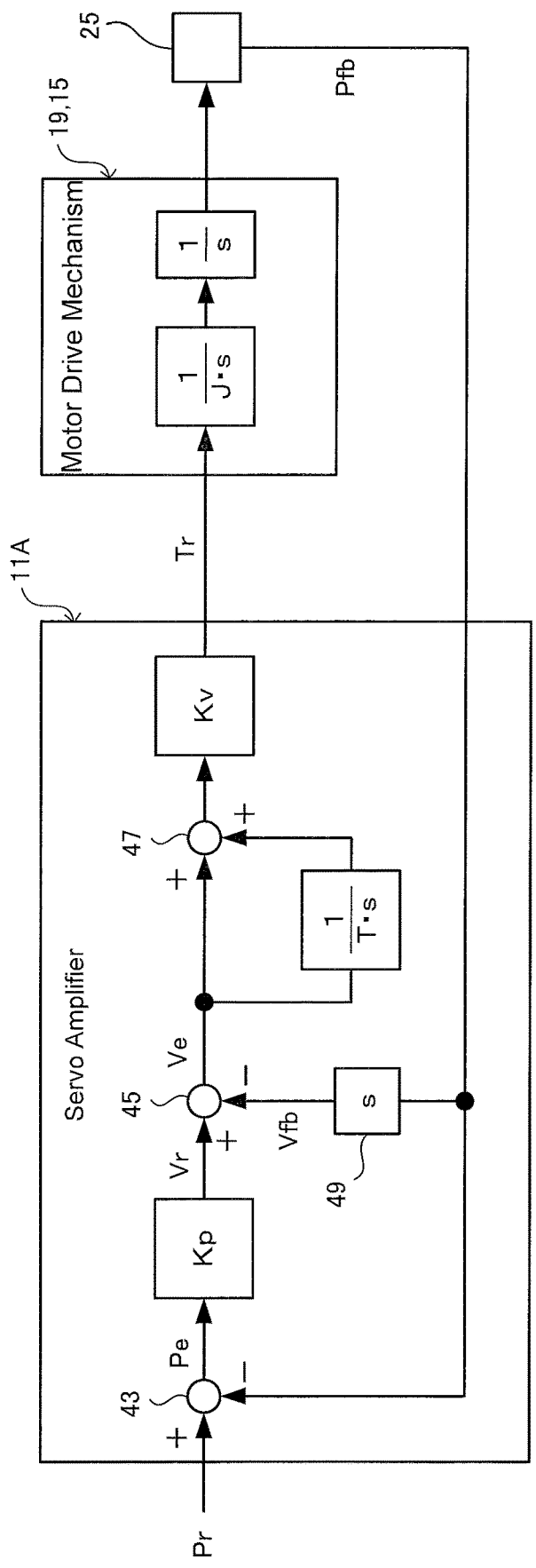
FIG. 3 is a block diagram showing an example of the configuration of a feedback control system in the servo amplifier.

Next, an example of a configuration of a feedback control system in each servo amplifier will be described with reference to FIG. 3. Although the servo amplifier 11A is shown as an example in FIG. 3, the other servo amplifiers 9, 11B, 13A, and 13B have the same configuration. In FIG. 3, it is represented by a transfer function type control block.

The servo amplifier 11A includes a subtracter 43, a position loop gain Kp, a subtracter 45, an integrator (1/T·$), an adder 47, a speed loop gain Kv, and a speed calculator 49.

The subtractor 43 subtracts the detection position Pfb detected by the linear encoder 25 from the position command Pr received from the controller 7A, and outputs a position deviation Pe. The position loop gain Kp multiplying the position deviation Pe by the position loop gain Kp and outputs speed command Vr. The position loop gain Kp performs so-called position proportional control.

The subtractor 45 subtracts the detection speed Vfb output from the speed calculator 49 from the speed command Vr and outputs a speed deviation Ve. The integrator (1/T·s) performs an integration operation on the speed deviation Ve based on a speed loop integration time constant T. The adder 47 adds the speed deviation Ve and the output of the integrator (1/T·s) and outputs the result. The speed loop gain Kv multiplies the output of the adder 47 by the speed loop gain Kv to output the torque command Tr. The integrator (1/T·s) and the speed loop gain Kv perform so-called velocity integral proportional control.

The speed calculator 49 outputs the detection speed Vfb based on the detection position Pfb detected by the linear encoder 25. The speed calculator 49 is composed of, for example, a differentiator s.

The motor drive mechanism 19, 15 corresponds to the linear motor 19 and the gantry mechanism 15, and is a mathematical model based on the moment of inertia J of the entire movable mechanism in which the movable element of the linear motor 19 and the movable portion of the gantry mechanism 15 are coupled. For example, when the speed loop gain Kv is further multiplied by the inertia moment JO of the mover of the linear motor 19, the mathematical model in the motor drive mechanism 19, 15 may be defined by the inertia moment ratio.

As described above, the feedback control system configured by the servo amplifier 11A and the motor/drive mechanism 19, 15 has a double loop configuration (so-called P-IP control) of a feedback loop of a position proportional control system and a feedback loop of a speed integral proportional control system. In FIG. 3, a current control unit that outputs a drive current by, for example, PWM control to the motor/drive mechanism 19, 15 based on the torque command Tr and a feedback loop of a current control system provided in the current control unit are omitted to simplify the description.

3. Functional Configuration of Parameter Adjustment Apparatus and Servo Amplifier Next, an example of a functional configuration of the parameter adjustment apparatus 5 and the servo amplifier 11, 13 will be described with reference to FIGS. 4 to 6. Hereinafter, when the servo amplifiers 11A and 11B and the servo amplifiers 13A and 13B are not distinguished from each other, they are abbreviated as servo amplifiers 11, 13 and (the same applies to FIG. 4).

Figure 4:
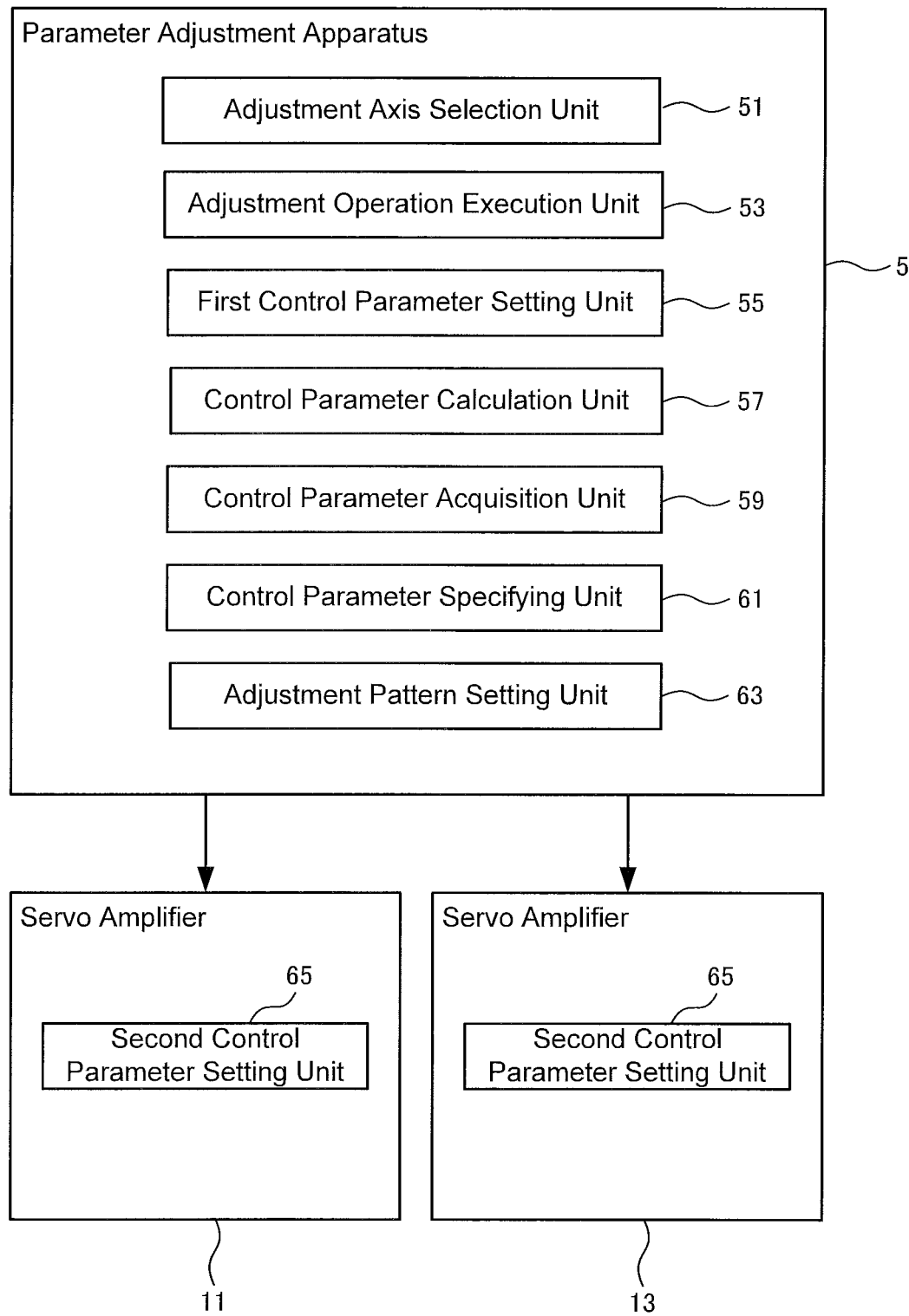
FIG. 4 is a block diagram showing an example of a functional configuration of the parameter adjustment apparatus 5 and the servo amplifier.

As illustrated in FIG. 4, the parameter adjustment apparatus 5 includes an adjustment axis selection unit (adjustment axis selection circuitry) 51, an adjustment operation execution unit (adjustment operation execution circuitry) 53, a first control parameter setting unit (first control parameter setting circuitry) 55, a control parameter calculation unit (control parameter calculation circuitry) 57, a control parameter acquisition unit (control parameter acquisition circuitry) 59, a control parameter specifying unit (control parameter specifying circuitry) 61, and an adjustment pattern setting unit (adjustment pattern setting circuitry) 63. Each servo amplifier 11, 13 has a second control parameter setting unit (second control parameter setting circuitry) 65.

In the multi-axis control systems 3A and 3B, the adjustment axis selection unit 51 selects two or more targets out of axes for which the control parameters of the servo amplifiers are to be adjusted. The adjustment axis selection unit 51 selects two or more targets out of axes based on a user's selection operation.

FIG. 5 shows an example of a selection screen for the user to select an axis to be adjusted. In FIG. 5, all axes adjustable in the multi-axis control system 3 are displayed on the adjustment axis list display section 67. By checking the check box 69, the user can select an axis on which automatic adjustment is simultaneously performed. In the example illustrated in FIG. 5, for example, five axes of AXIS001A to AXIS004A are displayed as adjustable axes, and three axes of AXIS001A, AXIS001B, and AXIS004A are selected from the five axes.

The axis checked in the check box 69 is automatically added to the detailed setting display unit 71. The user can select an axis for adjusting the control parameter to the same value by further checking the check box 73. The adjustment axis selection unit 51 selects two or more targets out of axes checked in the check box 73. In the example shown in FIG. 5, of the three axes AXIS001A, AXIS001B, and AXIS004A that are automatically adjusted at the same time, two axes AXIS001A and AXIS001B are selected as axes to be adjusted to the same value. It should be noted that AXIS004A not selected is adjusted simultaneously with AXIS001A and AXIS001B, but is allowed to be adjusted to a different value.

For example, in the case of the multi-axis control system 3A having the gantry mechanism 15, three axes corresponding to the servo amplifiers 9, 11A, and 13A that simultaneously perform adjustment are selected in the check box 69, and two axes corresponding to the servo amplifiers 11A and 13A that adjust the control parameters to the same value are selected in the check box 73. Further, in the case of the multi-axis control system 3B having the XY stage mechanism 31, two axes corresponding to the servo amplifiers 11B and 13B to be simultaneously adjusted are selected in the check box 69, and both axes are selected in the check box 73 as axes for adjusting the control parameters to the same value.

In the detailed setting display unit 71, setting buttons 75 for performing detailed setting are provided for the respective axes. By operating the setting button 75, the user opens a detailed setting screen (not shown), and can perform detailed of command settings (for example, a movement distance and a movement speed of an adjustment operation), parameter ranges (for example, an upper limit value of each gain), and the like.

Returning to FIG. 4, the adjustment operation execution unit 53 performs an adjustment operation on two or more targets that are selected by the adjustment axis selection unit 51 based on a common command or an individual command. To be specific, when the axes to be adjusted are mechanically constrained as in the multi-axis control adjustment system 1A described above (when a first adjustment pattern described later is selected by the user), the adjustment operation execution unit 53 performs an adjustment operation on two or more targets that are selected by a common command. When the axes to be adjusted are not mechanically constrained as in the multi-axis control adjustment system 1B described above (when a second adjustment pattern described later is selected by the user), adjustment operations are performed on two or more targets that are selected by individual commands. When the adjustment operation is performed based on the individual command, the adjustment operation execution unit 53 substantially matches start timing and completion timing of adjustment with respect to two or more targets out of axes, and performs the adjustment operation simultaneously in parallel. That is, even if the adjustment of any axis is completed, the adjustment operation is continued until the adjustment of all the selected axes is completed. The command may be received by the parameter adjustment apparatus 5 from the controller 7 and transmitted to each servo amplifier 11, 13, or may be transmitted from the controller 7 to each servo amplifier 11, 13 by the parameter adjustment apparatus 5 controlling the controller 7.

The first control parameter setting unit 55 changes the timing of setting the control parameters for the two or more targets that are selected by the adjustment axis selection unit 51 according to the adjustment operation. Specifically, when the adjustment operation execution unit 53 performs an adjustment operation based on a common command (when a first adjustment pattern described later is selected by the user), the first control parameter setting unit 55 sets the control parameters with respect to the two or targes to the same value during execution of the adjustment operation. When the adjustment operation execution unit 53 performs an adjustment operation based on an individual command (when the user selects a second adjustment pattern to be described later), the first control parameter setting unit 55 sets the control parameters with respect to the two or more targets to the same value after the adjustment operation is completed. The control parameters set by the first control parameter setting unit 55 are control parameters related to responsiveness, and include, for example, the position loop gain Kp, the speed loop gain Kv, the speed loop integration time constant T, and parameters related to various filters.

When the adjustment operation execution unit 53 performs the adjustment operation based on the common command, the control parameter calculation unit 57 calculates the control parameters based on the observation values of two or more targets at the time of execution of the adjustment operation. The "observed value" is a state quantity of the linear motor, and is, for example, the detection position Pfb detected by the linear encoders 23, 25, 27, 39, 41 described above, the detection speed Vfb output from the speed calculator 49, or the like. The first control parameter setting unit 55 sets the control parameters calculated by the control parameter calculation unit 57 to the same value by reflecting the control parameter on two or more targets during execution of the adjustment operation.

When the adjustment operation execution unit 53 performs the adjustment operation based on the individual command, the control parameter acquisition unit 59 acquires the control parameters calculated by the servo amplifiers 11, 13 of two or more targets after the adjustment operation is completed.

The control parameter specifying unit 61 determines and specifies a control parameter having the lowest responsiveness among the control parameters acquired by the control parameter acquisition unit 59. The first control parameter setting unit 55 sets the control parameters specified by the control parameter specifying unit 61 to the same value by reflecting the control parameter on two or more targets after the adjustment operation is completed.

The adjustment pattern setting unit 63 sets the adjustment pattern of the control parameter to the first adjustment pattern when the two or more targets that are selected by the adjustment axis selection unit 51 are mechanically constrained, and sets the adjustment pattern of the control parameter to the second adjustment pattern when the two or more targets that are selected by the adjustment axis selection unit 51 are not mechanically constrained. The "first adjustment pattern" is an adjustment pattern in which a control parameter related to responsiveness is always set to be the same for all axes during an adjustment operation. The "second adjustment pattern" is an adjustment pattern that individually adjusts the control parameter related to responsiveness during the adjustment operation and sets the final adjustment value to the same value for all axes.

When the first adjustment pattern is set by the adjustment pattern setting unit 63, the adjustment operation execution unit 53 performs an adjustment operation based on a common command. When the second adjustment pattern is set by the adjustment pattern setting unit 63, the adjustment operation execution unit 53 performs an adjustment operation based on an individual command. The first control parameter setting unit sets the control parameters to the same value for two or more axes during the execution of the adjustment operation when the first adjustment pattern is set by the adjustment pattern setting unit 63, and sets the control parameter to the same value for two or more axes after the completion of the adjustment operation when the second adjustment pattern is set by the adjustment pattern setting unit 63.

The adjustment pattern setting unit 63 sets an adjustment pattern of the control parameters to either the first adjustment pattern or the second adjustment pattern based on the selection operation of the user.

FIG. 5 described above shows an example of a selection screen for the user to select an adjustment pattern of a control parameter. In FIG. 5, an adjustment pattern selection unit 77 is provided below the detailed setting display unit 71. The adjustment pattern selection unit 77 is configured as, for example, a pull-down menu, and the user can select either the first adjustment pattern or the second adjustment pattern by operating the adjustment pattern selection unit 77. In the example shown in FIG. 5, the first adjustment pattern is selected.

A collective setting button 79 is provided below the adjustment pattern selection unit 77. By operating the collective setting button 79, the user opens a detailed setting screen (not shown), and can collectively perform detailed settings for all axes, such as command settings (for example, the movement distance and movement speed of the adjustment operation) and parameter ranges (for example, the upper limit value of the gain). It should be noted that setting is individually performed for each axis, the detailed setting is performed by the above-described setting button 75. The "close detailed setting" button 81 is a button for closing the selection screen shown in FIG. 5.

FIG. 6 shows a table in which the contents of the first adjustment pattern and the contents of the second adjustment pattern are collated. As shown in FIG. 6, a process of searching for a control parameter (referred to as a gain in FIGS. 6 and 7) related to responsiveness based on an observed value of each axis is executed by the parameter adjustment apparatus 5 in the first adjustment pattern, whereas the process is executed by each servo amplifier 11, 13 in the second adjustment pattern. In addition, the second control parameter setting unit 65 of each servo amplifier 11, 13 executes the vibration suppression in both the first adjustment pattern and the second adjustment pattern. The set value of the inertia is individually set for each axis in both the first adjustment pattern and the second adjustment pattern. In addition, the process of finally setting the control parameter related to the adjusted responsiveness for each axis is performed by the parameter adjustment apparatus 5 in both the first adjustment pattern and the second adjustment pattern. The commands from the controllers 7A and 7B are the same commands for all the selected axes in the first adjustment pattern, whereas they are individual commands for the selected axes in the second adjustment pattern. In addition, a specific example of the application device is the gantry mechanism or the like which is strongly mechanically constrained between the axes and operates by the same command in the first adjustment pattern, whereas in the second adjustment pattern, the mechanical constraint between the axes is not strong and operates by a different command, but is finally an XY stage mechanism or the like which has the same parameter setting.

Referring back to FIG. 4, the second control parameter setting unit 65 of each servo amplifier 11, 13 individually sets a control parameter related to vibration suppression when the adjustment operation execution unit 53 of the parameter adjustment apparatus 5 performs an adjustment operation on the basis of a common command or an individual command for two or more selected axes. The control parameter relating to vibration suppression is, for example, inertia (the aforementioned moment of inertia J), vibration frequency, or the like. Since it is preferable to immediately change and reflect the control parameters related to the vibration suppression in order to prevent the machine from being damaged due to the occurrence or oscillation of vibration, the servo amplifiers 11, 13 of the respective axes are individually set instead of the parameter adjustment apparatus 5.

Note that the processing and the like in each processing unit of the parameter adjustment apparatus 5 (the same applies to the servo amplifier 11, 13) described above are not limited to the example of the sharing of the processing, and may be processed by a smaller number of processing units (for example, one processing unit), or may be processed by subdivided processing units. In addition, the function of the above-described parameter adjustment apparatus 5 (the same applies to the servo amplifier 11, 13) may be implemented by a program executed by a CPU901 (refer to FIG. 9) described later, or a part or all of the function may be implemented by an actual device such as an ASIC, an FPGA, or another electric circuit.

4. Control Procedure by Parameter Adjustment Apparatus and Servo Amplifier

Figure 7:
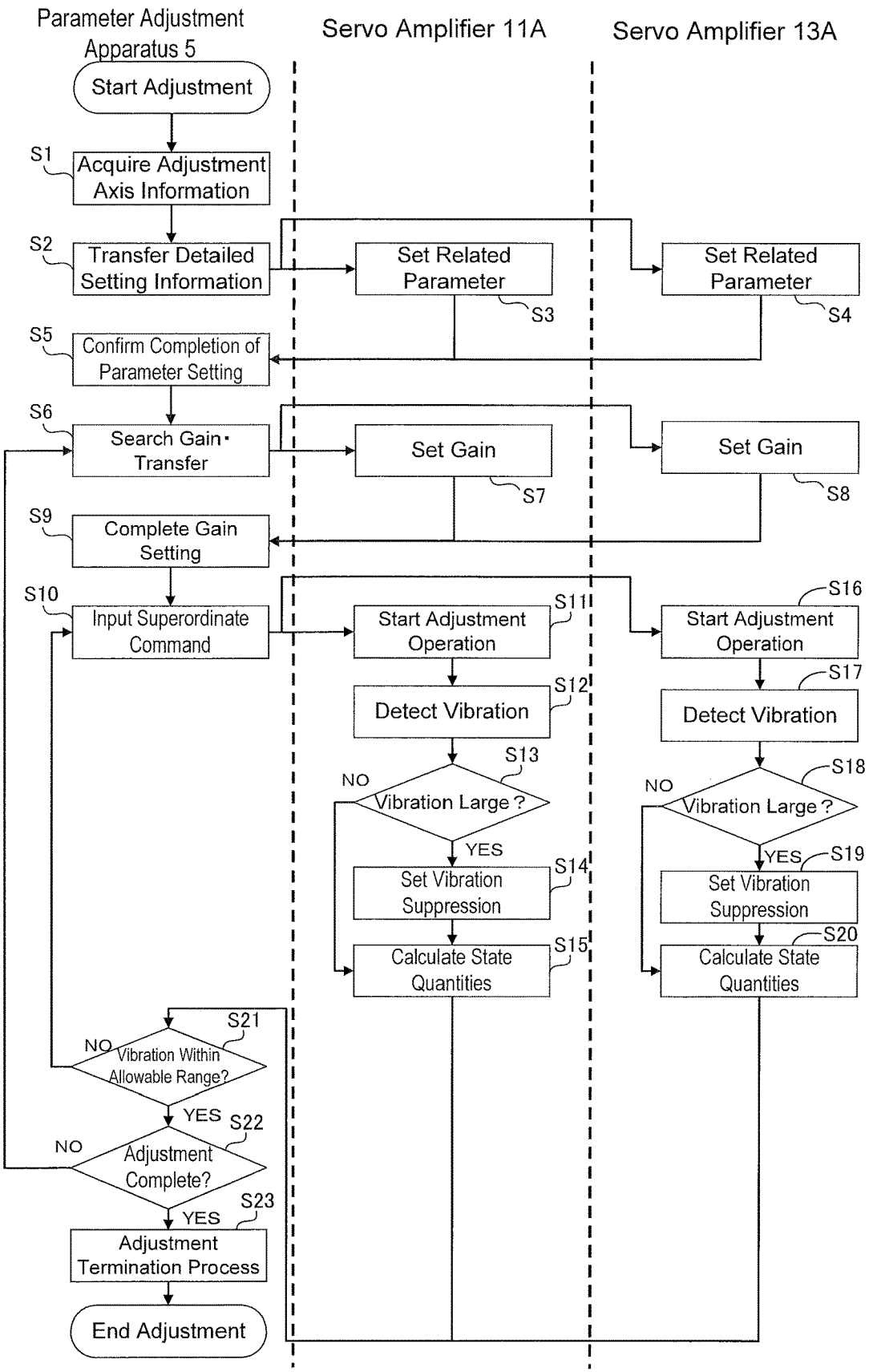
FIG. 7 is a flowchart showing an example of a control procedure executed by the parameter adjustment apparatus and the plurality of servo amplifiers when the first adjustment pattern is selected.
Figure 8:
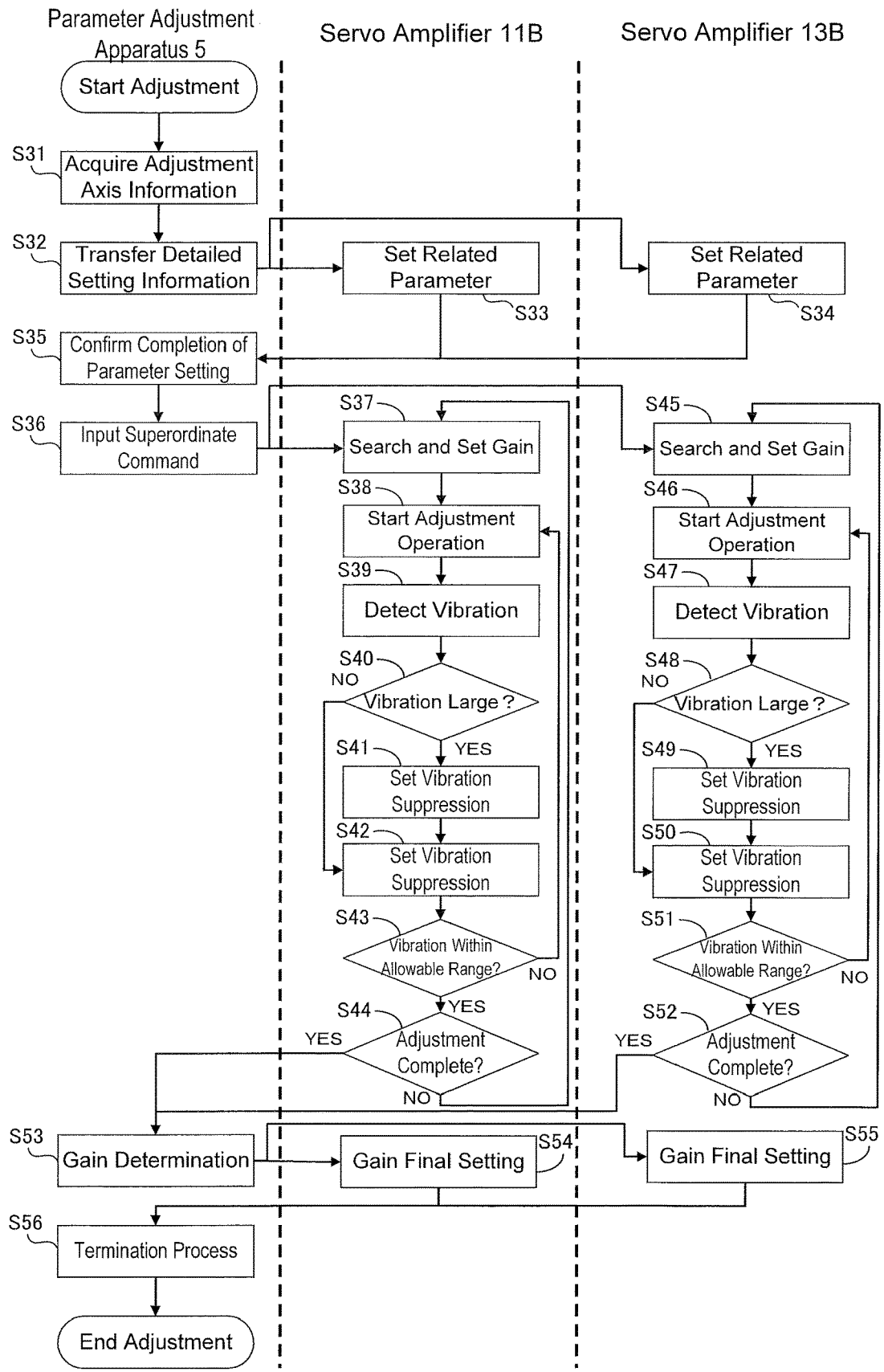
FIG. 8 is a flowchart showing an example of a control procedure executed by the parameter adjustment apparatus and the plurality of servo amplifiers when the second adjustment pattern is selected.

Next, an example of a control procedure executed by the parameter adjustment apparatus 5 and the servo amplifier 11, 13 will be described with reference to FIGS. 7 and 8. FIG. 7 is a flowchart illustrating an example of a control procedure when the first adjustment pattern is selected, and FIG. 8 is a flowchart illustrating an example of a control procedure when the second adjustment pattern is selected.

First, a case where the first adjustment pattern is selected will be described. In FIG. 7, after the user completes the selection of the adjustment axis and the detailed setting on the selection screen shown in FIG. 5, the parameter adjustment apparatus 5 starts the adjustment of the control parameter by operating, for example, an adjustment start button (not illustrated).

In step S1, the parameter adjustment apparatus 5 acquires the adjustment axes selected by the user on the selection screen shown in FIG. 5 and the adjustment axes information related to the detailed settings. The adjustment axis selection unit 51 described above selects two or more targets (in this example, two axes corresponding to the servo amplifiers 11A and 13A) for which the control parameters are to be adjusted based on the acquired adjustment-axis information, and the adjustment pattern setting unit 63 sets the adjustment pattern of the control parameters to the first adjustment pattern in this example based on the acquired adjustment-axis information.

In step S2, the parameter adjustment apparatus 5 transfers detailed setting information for the respective axes included in the information acquired in step S1 to the servo amplifiers 11A and 13A, respectively.

In step S3, the servo amplifier 11A sets related parameters necessary for executing the adjustment operation based on the received detailed setting information. Similarly, in step S4, the servo amplifier 13A sets related parameters necessary for executing the adjustment operation based on the received detailed setting information. Upon completion of the setting of the related parameters, the servo amplifiers 11A and 13A transmit an answerback signal to the parameter adjustment apparatus 5.

In step S5, the parameter adjustment apparatus 5 receives the answerback signals from the servo amplifiers 11A and 13A, and confirms that the parameter setting is completed. When the parameter setting is not completed because one or both axes are not in the servo ready state, for example, the parameter adjustment apparatus 5 displays an alarm and does not start the adjustment operation for all axes.

In step S6, the parameter adjustment apparatus 5 executes calculation processing for searching for a control parameter (referred to as a gain in FIG. 7) related to responsivity based on state quantities (see step S15 and step S20 described later) calculated and transmitted by the servo amplifiers 11A and 13A by the control parameter calculation unit 57, and transfers the calculated control parameter to the servo amplifiers 11A and 13A by the first control parameter setting unit 55. In this step S6, the control parameters transmitted to the servo amplifiers 11A and 13A have the same value.

In step S7, the servo amplifier 11A sets a control parameter (referred to as a gain in FIG. 7) related to responsivity based on the received control parameter. Similarly, in step S8, the servo amplifier 13A sets a control parameter (referred to as a gain in FIG. 7) related to responsivity based on the received control parameter. When the setting of the gains is completed, the servo amplifiers 11A and 13A transmit an answerback signal to the parameter adjustment apparatus 5.

In step S9, the parameter adjustment apparatus 5 receives the answerback signals from the servo amplifiers 11A and 13A, and confirms that the setting of the control parameter (referred to as gain in FIG. 7) related to the response is completed.

In step S10, the parameter adjustment apparatus 5 causes the adjustment operation execution unit 53 to transmit a superordinate command (position command) to each of the servo amplifiers 11A and 13A to start an adjustment operation. In this step S10, the same command is transmitted to the servo amplifiers 11A and 13A.

In step S11, the servo amplifier 11A starts the adjustment operation of the linear motor 19 based on the received position command.

In step S12, the servo amplifier 11A executes vibration detection processing, and in step S13, it is determined whether or not the detected vibration is larger than a predetermined threshold value. When the detected vibration is equal to or less than the predetermined threshold value (step S13: NO), the process proceeds to step S15 described later. On the other hand, when the detected vibration is larger than the predetermined threshold value (step S13: YES), the process proceeds to step S14.

In step S14, the servo amplifier 11A sets a control parameter related to vibration suppression by the second control parameter setting unit 65.

In step S15, the servo amplifier 11A calculates state quantities such as the detection position Pfb and the detection speed Vfb based on the detection signal of the linear encoder 25 described above, and sequentially transmits the calculated state quantities to the parameter adjustment apparatus 5.

On the other hand, in step S16, the servo amplifier 13A starts the adjustment operation of the linear motor 21 based on the received position command.

In step S17, the servo amplifier 13A executes vibration detection processing, and in step S18, it is determined whether or not the detected vibration is larger than a predetermined threshold value. When the detected vibration is equal to or less than the predetermined threshold value (step S18: NO), the process proceeds to step S20 described later. On the other hand, when the detected vibration is larger than the predetermined threshold value (step S18: YES), the process proceeds to step S19.

In step S19, the servo amplifier 13A sets a control parameter related to vibration suppression by the second control parameter setting unit 65.

In step S20, the servo amplifier 13A calculates state quantities such as the detection position Pfb and the detection speed Vfb based on the detection signal of the linear encoder 27 described above, and sequentially transmits the calculated state quantities to the parameter adjustment apparatus 5.

In step S21, the parameter adjustment apparatus 5 determines whether or not the vibration is within a predetermined allowable range (for example, equal to or less than the threshold value) by updating the control parameter related to vibration suppression in step S14 and step S19 described above. If the vibration is out of the allowable range (step S21: NO), the process returns to step S10. In this manner, while sequentially changing the control parameter related to vibration suppression, steps S10 to S15 and S21, and steps S10 and S16 to S21 are repeated until the vibration falls within the predetermined allowable range. When the vibration is within the allowable range (step S21: YES), the process proceeds to step S22.

In step S22, the parameter adjustment apparatus 5 determines whether or not the adjustment operation for both the servo amplifiers 11A and 13A has been completed. When the adjustment operation is not completed (step S22: NO), the process returns to step S6. In this way, while sequentially changing the control parameter (referred to as gain in FIG. 7) related to the response, the processing of steps S6 to S22 is repeated until the adjustment operation is completed. On the other hand, when the adjustment operation is completed (step S22: YES), the process proceeds to step S23.

In step S23, the parameter adjustment apparatus 5 executes adjustment termination processing by terminating the adjustment operation of the linear motor 19, 21 by the servo amplifiers 11A and 13A. Thus, this flowchart is ended.

The setting of the control parameters (Kp, Kv, T, etc.) relating to the responsiveness also affects the processing relating to vibration suppression. Therefore, in the above-described control procedure, the parameter adjustment apparatus 5 waits without transmitting the calculated control parameters to the servo amplifiers 11A and 13A while the adjustment of the control parameters related to vibration suppression is performed on the servo amplifiers 11A and 13A side (step S10 to step S21), and transmits the control parameters calculated in step S6 to the servo amplifiers 11A and 13A after the vibration falls within the allowable range (step S21: YES).

Next, a case where the second adjustment pattern is selected will be described. In FIG. 8, after the user completes the selection of the adjustment axis and the detailed setting on the selection screen shown in FIG. 5, the parameter adjustment apparatus 5 starts the adjustment of the control parameter by operating, for example, an adjustment start button (not illustrated).

In step S31, the parameter adjustment apparatus 5 acquires the adjustment axis information related to the detailed settings including adjustment axes selected by the user on the selection screen shown in FIG. 5. The adjustment axis selection unit described above selects two or more axes (in this example, two axes corresponding to the servo amplifiers 11B and 13B) for which the control parameters are to be adjusted based on the acquired adjustment axis information, and the adjustment pattern setting unit 63 sets the adjustment pattern of the control parameters to the second adjustment pattern in this example based on the acquired adjustment axis information.

In step S32, the parameter adjustment apparatus 5 transfers detailed setting information for the respective axes included in the information acquired in step S21 to the servo amplifiers 11B and 13B, respectively.

In step S33, the servo amplifier 11B sets related parameters necessary for executing the adjustment operation based on the received detailed setting information. Similarly, in step S34, the servo amplifier 13B sets related parameters necessary for executing the adjustment operation based on the received detailed setting information. Upon completion of the setting of the related parameters, the servo amplifiers 11B and 13B transmit an answerback signal to the parameter adjustment apparatus 5.

In step S35, the parameter adjustment apparatus 5 receives the answerback signals from the servo amplifiers 11B and 13B, and confirms that the parameter setting is completed. When the parameter setting is not completed because one or both axes are not in the servo ready state, for example, the parameter adjustment apparatus 5 displays an alarm and does not start the adjustment operation for all axes.

In step S36, the parameter adjustment apparatus 5 causes the adjustment operation execution unit 53 to transmit a superordinate command (position command) to each of the servo amplifiers 11B and 13B to start an adjustment operation. In this step S36, the commands transmitted to the servo amplifiers 11B and 13B are individually different commands.

In step S37, the servo amplifier 11B executes arithmetic processing of searching for a control parameter (referred to as a gain in FIG. 8) related to responsivity based on the state quantity calculated in step S32 described later, and sets the calculated control parameter.

In step S38, the servo amplifier 11B starts the adjustment operation of the linear motor 33 based on the received position command and the set control parameter.

In step S39, the servo amplifier 11B executes vibration detection processing, and in step S40, it is determined whether or not the detected vibration is larger than a predetermined threshold value. When the detected vibration is equal to or less than the predetermined threshold value (step S40: NO), the process proceeds to step S42 described later. On the other hand, when the detected vibration is larger than the predetermined threshold value (step S40: YES), the process proceeds to step S41.

In step S41, the servo amplifier 11B sets a control parameter related to vibration suppression by the second control parameter setting unit 65.

In step S42, the servo amplifier 11B calculates state quantities such as the detection position Pfb and the detection speed Vfb based on the detection signal of the linear encoder 39.

In step S43, the servo amplifier 11B determines whether or not the vibration is within a predetermined allowable range (for example, equal to or less than the threshold value) by updating the control parameter related to vibration suppression in step S31. If the vibration is out of the allowable range (step S43: NO), the process returns to step S38. In this manner, steps S38 to S43 are repeated until the vibration falls within the predetermined allowable range while sequentially changing the control parameter related to vibration suppression. When the vibration is within the allowable range (step S43: YES), the process proceeds to step S44.

In step S44, the servo amplifier 11B determines whether or not the adjustment operation is completed. When the adjustment operation is not completed (step S44: NO), the process returns to step S37. In this way, while sequentially changing the control parameter (referred to as gain in FIG. 8) related to the response, the processing of steps S37 to S44 is repeated until the adjustment operation is completed. On the other hand, when the adjustment operation is completed (step S44: YES), the process proceeds to step S53 described later.

On the other hand, in step S45, the servo amplifier 13B executes arithmetic processing of searching for a control parameter (referred to as a gain in FIG. 8) related to responsivity based on the state quantity calculated in step S50 described later, and sets the calculated control parameter.

In step S46, the servo amplifier 13B starts the adjustment operation of the linear motor 35 based on the received position command and the set control parameter.

In step S47, the servo amplifier 13B executes vibration detection processing, and in step S48, it is determined whether or not the detected vibration is larger than a predetermined threshold value. When the detected vibration is equal to or less than the predetermined threshold value (step S48: NO), the process proceeds to step S50 described later. On the other hand, when the detected vibration is larger than the predetermined threshold value (step S48: YES), the process proceeds to step S9.

In step S49, the servo amplifier 13B sets a control parameter related to vibration suppression by the second control parameter setting unit 65.

In step S50, the servo amplifier 13B calculates state quantities such as the detection position Pfb and the detection speed Vfb based on the detection signal of the linear encoder 41.

In step S51, the servo amplifier 13B determines whether or not the vibration is within a predetermined allowable range (for example, equal to or less than the threshold value) by updating the control parameter related to vibration suppression in step S39. If the vibration is out of the allowable range (step S51: NO), the process returns to step S46. In this manner, steps S46 to S51 are repeated until the vibration falls within the predetermined allowable range while sequentially changing the control parameter related to vibration suppression. When the vibration is within the allowable range (step S51: YES), the process proceeds to step S52.

In step S52, the servo amplifier 13B determines whether or not the adjustment operation is completed. When the adjustment operation is not completed (step S52: NO), the process returns to step S45. In this manner, the processing from step 45 to step S52 is repeated until the adjustment operation is completed while sequentially changing the control parameter (referred to as gain in FIG. 8) related to responsivity. On the other hand, when the adjustment operation is completed (step S52: YES), the process proceeds to step S53.

As described above, when the adjustment operation is completed in both of the servo amplifiers 11B and 13B (step S44: YES, step S52: YES), the process proceeds to step S53.

In step S53, the parameter adjustment apparatus 5 acquires control parameters (in FIG. 8, referred to as gain) related to the finally set responsivity from the servo amplifiers 11B and 13B by the control parameter acquisition unit 59. At this time, even when the adjustment of one of the servo amplifiers 11B and 13B is completed first and the control parameter is acquired, the parameter adjustment apparatus 5 does not advance the process until the adjustment of the other axis of the servo amplifiers is completed and the control parameter is acquired. That is, the axis for which the adjustment has been completed first enters a completion waiting state, and the control parameter is not updated until the adjustment operation of the other axis is completed.

Then, by the control parameter specifying unit 61 the parameter adjustment apparatus 5 determines the control parameter having the lowest responsiveness among the acquired control parameters and specifies the control parameter as the control parameter related to the final responsiveness. Then, the first control parameter setting unit 55 transmits the specified control parameters to the servo amplifiers 11B and 13B, respectively. In this step S53, the control parameters transmitted to the servo amplifiers 11B and 13B have the same value.

In step S54, the servo amplifier 11B finally sets a control parameter (referred to as a gain in FIG. 8) related to responsivity based on the received control parameter. Similarly, in step S55, the servo amplifier 13B finally sets a control parameter (referred to as a gain in FIG. 8) related to responsivity based on the received control parameter. As a result, in the servo amplifiers 11B and 13B, the control parameters (Kp, Kv, T, etc.) relating to the response are set to the same value. When the setting of the control parameters is completed, the servo amplifiers 11B and 13B transmit an answerback signal to the parameter adjustment apparatus 5.

In step S56, the parameter adjustment apparatus 5 receives the answerback signals from the servo amplifiers 11B and 13B, and confirms that setting of final control parameters is completed. Then, the parameter adjustment apparatus 5 executes adjustment termination processing by terminating the adjustment operation of the linear motor 33, 35 by the servo amplifiers 11B and 13B. Thus, this flowchart is ended.

5. Advantageous Effects of Embodiment

As described above, in the multi-axis control systems 3A and 3B having a plurality of axes each of which represents a combination of one servo amplifier and one motor and synchronously controlling the plurality of axes based on commands from the controllers 7A and 7B, the parameter adjustment apparatus 5 of the present embodiment includes the adjustment axis selection unit 51 that selects two or more targets to be subjected to adjustment of control parameters of the servo amplifier, the adjustment operation execution unit 53 that performs adjustment operations on the two or more targets that are selected based on common commands or individual commands, and the first control parameter setting unit 55 that changes the timing of setting control parameters of the two or more targets according to the adjustment operations. Thus, the following effects are obtained.

That is, in the multi-axis control system in which two or more targets are controlled in synchronization with each other based on a command from the controller, two or more targets may be mechanically constrained as in the gantry mechanism 15, for example, or two or more targets may not be mechanically constrained as in the XY stage mechanism, for example.

In the former case, it is preferable that the adjustment operations for two or more targets are performed with the same command and the same control parameter in order to suppress the occurrence of vibration induced by inter-axis interference and damage to the machine due to oscillation. In this embodiment, in such a case, the adjustment operation execution unit 53 performs the adjustment operation on two or more targets based on the common command, and the first control parameter setting unit 55 sets the control parameters to the same value when the adjustment operation is executed. This makes it possible to automatically adjust the control parameters to appropriate values for the two or more targets that are selected while preventing damage to the machine due to vibration or oscillation.

In the latter case, although the control parameters do not need to be the same because the adjustment operation differs in command depending on the axis, the final setting of the control parameters is preferably the same in order to improve the accuracy of the synchronous control after adjustment. In this embodiment, in such a case, the adjustment operation execution unit 53 performs the adjustment operation on two or more targets based on individual commands, and the first control parameter setting unit 55 sets the control parameters to the same value after the adjustment operation is completed. Thus, the control parameters can be automatically adjusted to appropriate values for the two or more targets that are selected.

As described above, according to the parameter adjustment apparatus 5 of the present embodiment, the control parameter can be automatically adjusted regardless of whether two or more targets to be adjusted are mechanically constrained or not. Therefore, the target range of the multi-axis control system capable of adjusting the control parameter can be expanded, and the versatility can be improved.

In the present embodiment, in particular, the first control parameter setting unit 55 sets the control parameters with respect to the two or more targets to the same value during execution of the adjustment operation when the adjustment operation is performed based on a common command, and sets the control parameters to the same value with respect to the two or more targets after completion of the adjustment operation when the adjustment operation is performed based on an individual command.

Accordingly, for example, in a case where two or more targets are mechanically constrained as in the gantry mechanism 15, adjustment operations for the two or more targets can be performed with the same command and the same control parameter. Therefore, it is possible to automatically adjust the control parameter to an appropriate value for two or more targets while preventing damage to the machine due to the occurrence of vibration or oscillation. In addition, for example, in a case where two or more targets are not mechanically constrained as in the XY stage mechanism 31, the final setting of the control parameters can be set to the same value while allowing the two or more targets to have different control parameters during the adjustment operation. Therefore, the accuracy of the synchronization control after the adjustment can be improved.

Particularly in the present embodiment, the parameter adjustment apparatus 5 further includes a control parameter calculation unit 57 that calculates control parameters based on observed values of two or more targets during execution of an adjustment operation when the adjustment operation is performed based on a common command.

In the present embodiment, the control parameters during the adjustment operation are calculated by the parameter adjustment apparatus 5 based on the observed values of the respective axes, and the calculated control parameters are reflected in the servo amplifiers 11A and 13A of the respective axes. In this way, it is possible to improve the certainty that the control parameters of the respective axes during the adjustment operation are the same.

Particularly in the present embodiment, the parameter adjustment apparatus 5 further includes a control parameter acquisition unit 59 that acquires control parameters calculated by the servo amplifiers 11B and 13B of two or more targets after the adjustment operation is completed when the adjustment operation is performed based on individual commands, and a control parameter specifying unit 61 that identifies a control parameter with the lowest response among the acquired control parameters.

In the present embodiment, the calculation of the control parameters during the adjustment operation is performed in the servo amplifiers 11B and 13B of the respective axes, and the calculated control parameters are acquired by the parameter adjustment apparatus 5 after the completion of the adjustment operation to determine the final control parameters, which are reflected in the servo amplifiers 11B and 13B of the respective axes. In this way, it is possible to prevent the control parameter relating to responsiveness from becoming excessively low. In addition, by determining the control parameter having the lowest response among the acquired control parameters as the final control parameter, it is possible to suppress the occurrence of the axes in which the control parameters cannot be set due to restrictions of the servo amplifiers 11B and 13B of the respective axes.

In the present embodiment, in particular, when the adjustment operation is performed on two or more targets based on individual commands, the adjustment operation execution unit 53 substantially matches start timing and the completion timing of adjustment with respect to the two or more targets, and performs the adjustment in parallel.

If the adjustment operation is performed one axis at a time with respect to the XY stage mechanism 31, since the other axes are stopped, the adjustment result in the specific posture is obtained. In the present embodiment, the substantially matching the start timing and the completion timing of adjustment with respect to two or more targets of the XY stage mechanism 31 and simultaneously performing the adjustment operations of the two or more targets in parallel, it is possible to adjust the control parameter in consideration of the posture change (change in load inertia) of the XY stage mechanism 31.

In the present embodiment, particularly, the parameter adjustment apparatus 5 further includes an adjustment pattern setting unit 63 that sets the adjustment pattern of the control parameters to a first adjustment pattern when two or more targets that are selected are mechanically constrained, and sets the adjustment pattern of the control parameter to a second adjustment pattern when two or more targets that are selected are not mechanically constrained, wherein the adjustment operation execution unit 53 performs the adjustment operation based on a common command when set to the first adjustment pattern, and performs the adjustment operation based on an individual command when set to the second adjustment pattern, and when the first adjustment pattern is set, the first control parameter setting unit 55 sets the control parameters to the same value for the two or more targets at the time of execution of the adjustment operation, and when the second adjustment pattern is set, the first control parameter setting unit 55 sets the control parameters to the same value for the two or more targets after completion of the adjustment operation.

Thus, the setting of the adjustment pattern of the control parameter can be changed according to the presence or absence of the mechanical constraint. As a result, user convenience can be improved, and the control parameter can be automatically adjusted to an appropriate value regardless of whether two or more targets to be adjusted are mechanically constrained or not.

Particularly in the present embodiment, the control parameter is a control parameter related to responsiveness. Thus, for example, in a case where two or more targets are mechanically constrained as in the gantry mechanism 15, adjustment operations for the two or more targets can be performed with the same responsiveness. Therefore, it is possible to automatically adjust the control parameter to an appropriate value for two or more targets while preventing damage to the machine due to the occurrence of vibration or oscillation. In addition, for example, in a case where two or more targets are not mechanically constrained as in the XY stage mechanism 31, it is possible to allow the two or more targets to have different responsiveness during the adjustment operation and to finally have the same responsiveness after the adjustment. Therefore, the accuracy of the synchronization control after the adjustment can be improved.

Particularly in the present embodiment, the multi-axis control adjustment systems 1A and 1B include the multi-axis control systems 3A and 3B and the parameter adjustment apparatus 5 that adjusts the control parameters of the servo amplifiers for two or more axes of the multi-axis control systems 3A and 3B.

As a result, it is possible to realize the multi-axis control adjustment system with high versatility so as to expand the target range of the multi-axis control system capable of adjusting the control parameter.

In the present embodiment, in particular, the servo amplifiers 9, 11A, 11B, 13A, and 13B include the second control parameter setting unit 65 that individually sets the control parameters related to vibration suppression when the adjustment operation execution unit 53 of the parameter adjustment apparatus 5 performs an adjustment operation based on a common command or an individual command for two or more targets that are selected.

In the present embodiment, the control parameters related to vibration suppression are individually set not by the parameter adjustment apparatus 5 but by the servo amplifier of each axis. Thus, it is possible to immediately change and reflect the control parameter related to the vibration suppression, and it is possible to quickly execute the vibration suppression processing with high urgency.

6. Modification Examples

Note that the disclosed embodiments are not limited to the above, and various modifications can be made without departing from the spirit and technical idea thereof.

For example, although the gantry mechanism in which two targets are mechanically constrained has been described above as an example in which two or more targets are mechanically constrained, the present invention may be applied to a mechanism other than the gantry mechanism, such as a mechanism in which three or more targets are mechanically constrained. The motor constituting the shaft is not limited to a linear motor, but may be a rotary motor.

Although the XY stage mechanism has been described as an example of a case where two or more targets that are selected are not mechanically constrained, the present invention can be applied to various mechanisms as long as two or more targets are controlled in synchronization with each other. For example, the present invention may be applied to various robots such as an XYZ stage mechanism in which three or more targets that are selected are synchronously controlled, a scalar robot, and a vertical articulated robot. In this case, the motor constituting the shaft is not limited to a linear motor but may be a rotary motor.

In the above description, the parameter adjustment apparatus 5 is provided separately from the multi-axis control system. However, for example, various functions of the parameter adjustment apparatus 5 may be implemented in a controller of the multi-axis control system and used as the parameter adjustment apparatus 5. In this case, the controller of the multi-axis control system corresponds to an example of the multi-axis control adjustment apparatus 71.

7. Hardware Configuration Example of Parameter Adjustment Apparatus

Next, with reference to FIG. 9, a hardware configuration example of the parameter adjustment apparatus 5 that realizes the processing implemented by the program executed by the parameter adjustment apparatus 5 described above will be described. Note that the same hardware configuration may be used except for a portion for supplying power in the servo amplifier 9, 11, 13.

Figure 9:
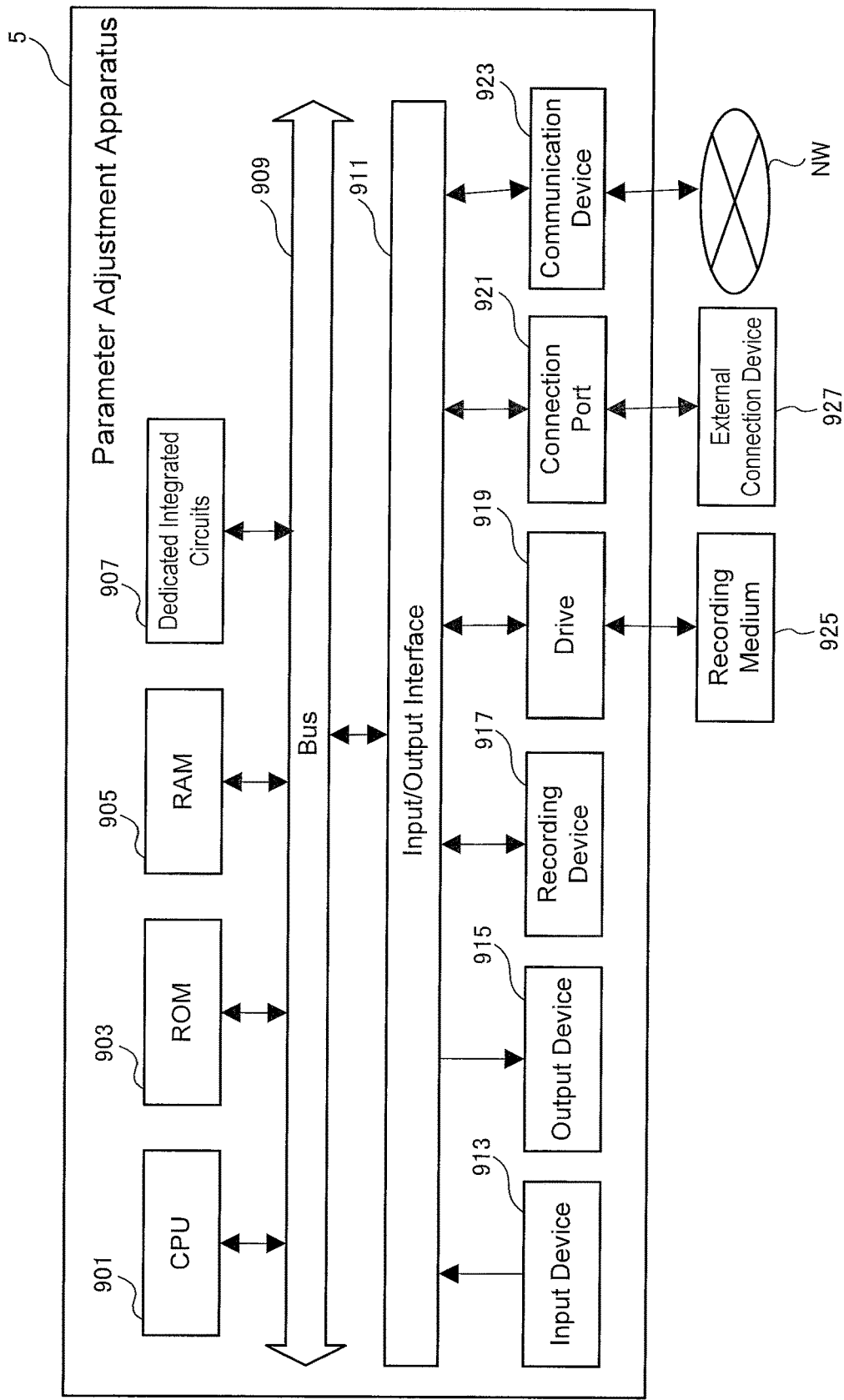
FIG. 9 is a block diagram showing an example of a hardware configuration of the parameter adjustment apparatus.

As illustrated in FIG. 9, the parameter adjustment apparatus 5 includes, for example, CPU901, ROM903, RAM905, dedicated integrated circuits 907 constructed for specific applications such as ASICs or FPGAs, an input device 913, an output device 915, a recording device 917, a drive 919, a connection port 921, and a communication device 923. These components are connected to each other via a bus 909 and an input/output interface 911 so that signals can be transmitted therebetween.

The program can be recorded in the recording device 917 or the like configured by, for example, ROM903, RAM905, hard disk, or the like.

In addition, the program may be temporarily or non-temporarily (permanently) recorded in a removable recording medium 925 such as a magnetic disk such as a flexible disk, an optical disk such as various CDs, MO disks, or DVDs, or a semiconductor memory. Such a recording medium 925 can also be provided as so-called package software. In this case, the program recorded in the recording medium 925 may be read by the drive 919 and recorded in the recording device 917 via the input/output interface 911, the bus 909, or the like.

Further, the program may be recorded in, for example, a download site, another computer, another recording device, or the like (not illustrated). In this case, the program is transferred via a network NW such as a LAN or the Internet, and the communication device 923 receives the program. The program received by the communication device 923 may be recorded in the recording device 917 via the input/output interface 911, the bus 909, or the like.

The program can also be recorded in, for example, an appropriate external connection device 927. In this case, the program may be transferred via an appropriate connection port 921 and recorded in the recording device 917 via the input/output interface 911, the bus 909, or the like.

Then, the CPU901 executes various processes in accordance with the program recorded in the recording device 917, thereby realizing the processes by the adjustment axis selection unit 51, the adjustment operation execution unit 53, the first control parameter setting unit 55, the control parameter calculation unit 57, the control parameter acquisition unit 59, the control parameter specifying unit 61, the adjustment pattern setting unit 63, and the like. At this time, the CPU901 may directly read the program from the recording device 917 and execute the program, or may load the program into the RAM905 and execute the program. Furthermore, when the CPU901 receives a program via the communication device 923, the drive 919, or the connection port 921, for example, the patient may directly execute the received program without recording the program in the recording device 917.

If necessary, the CPU901 may perform various processes based on signals and information input from the input device 913 such as a mouse, a keyboard, and a microphone (not illustrated).

Then, the CPU901 may output the result of executing the above-described process from an output device 915 such as a display device or an audio output device. Further, the CPU901 may transmit the processing result via the communication device 923 or the connection port 921 as necessary, or may record the processing result in the recording device 917 or the recording medium 925.

In the above description, when there is a description such as "vertical", "parallel", or "plane", the description does not have a strict meaning. That is, the terms "vertical", "parallel", and "plane" mean "substantially vertical", "substantially parallel", and "substantially plane", respectively, in consideration of design and manufacturing tolerances and errors.

Further, in the above description, when there is a description such as "the same", "the identical", "equal", or "different" in dimension, size, shape, position, or the like in appearance, the description does not have a strict meaning That is, "the same", "the identical", "equal", and "different" mean "substantially the same", "substantially the identical", "substantially equal", and "substantially different", respectively, in which design and manufacturing tolerances and errors are allowed.

In addition to the methods described above, the methods according to the embodiments and the modified examples may be appropriately combined and used. In addition, although not illustrated one by one, the above-described embodiment and each modification example are implemented by adding various changes within a range not departing from the gist thereof.

What is claimed is:

1. A multi-axis control adjustment apparatus comprising:
   adjustment axis selection circuitry configured to select a plurality of target axes among a plurality of axes each of which represents a combination of a motor and a motor control device configured to control the motor according to a control parameter of the motor control device;
   adjustment operation execution circuitry configured to perform adjustment operations in each of which the control parameter is adjusted with respect to each of the plurality of target axes;
   first control parameter setting circuitry configured to change, according to the adjustment operations, timing at which the control parameter is set with respect to each of the plurality of target axes; and
   adjustment pattern setting circuitry configured to set an adjustment pattern of the control parameter alternatively to a first adjustment pattern and to a second adjustment pattern,
   wherein, when the first adjustment pattern is set, a first adjustment operation is performed based on a common command and the control parameters are set to a same first value when the first adjustment operation is executed, and
   wherein, when the second adjustment pattern is set, a second adjustment operation is performed based on individual commands and the control parameters are set to a same second value with respect to the plurality of target axes after the second adjustment operation is completed.

2. The multi-axis control adjustment apparatus according to claim 1, wherein the adjustment operation execution circuitry is configured to perform the adjustment operations based on the common command or the individual commands.

3. The multi-axis control adjustment apparatus according to claim 1, wherein the control parameter relates to responsiveness.

4. A multi-axis control adjustment system comprising:
the multi-axis control adjustment apparatus according to claim 1; and
a multi-axis control system comprising:
the plurality of axes; and
a host controller configured to synchronously control the plurality of axes.

5. The multi-axis control adjustment system according to claim 4,
wherein the motor control device includes a second control parameter setting circuitry configured to individually set the control parameter related to vibration suppression when the adjustment operation execution circuitry performs the adjustment operations with respect to the plurality of target axes based on the common command or the individual commands.

6. The multi-axis control adjustment apparatus according to claim 1, wherein the plurality of axes are configured to be synchronously controlled by a host controller of a multi-axis control system.

7. The multi-axis control adjustment apparatus according to claim 1, wherein the first same value is equal to the second same value.

8. The multi-axis control adjustment apparatus according to claim 1, wherein the first same value is different from the second same value.

9. A multi-axis control adjustment apparatus comprising:
adjustment axis selection circuitry configured to select a plurality of target axes among a plurality of axes each of which represents a combination of a motor and a motor control device configured to control the motor according to a control parameter of the motor control device;
adjustment operation execution circuitry configured to perform adjustment operations in each of which the control parameter is adjusted with respect to each of the plurality of target axes; and
first control parameter setting circuitry configured to change, according to the adjustment operations, timing at which the control parameter is set with respect to each of the plurality of target axes,
wherein the adjustment operation execution circuitry is configured to perform the adjustment operations based on a common command or individual commands, and
wherein the first control parameter setting circuitry is configured to set the control parameter such that one control parameter with respect to one of the plurality of target axes is equal to another control parameter with respect to another of the plurality of target axes, while the adjustment operations are performed when the adjustment operations are performed based on the common command, and after completion of the adjustment operations when the adjustment operations are performed based on the individual commands.

10. The multi-axis control adjustment apparatus according to claim 9, further comprising:
control parameter calculation circuitry configured to calculate the control parameter based on observed values with respect to each of the plurality of target axes during the adjustment operations when the adjustment operations are performed based on the common command.

11. The multi-axis control adjustment apparatus according to claim 9, further comprising:
control parameter acquisition circuitry configured to acquire the control parameter calculated by the motor control device with respect to each of the plurality of target axes after the adjustment operations are completed when the adjustment operations are performed based on the individual commands; and
control parameter specifying circuitry configured to specify a lowest control parameter having a lowest responsiveness in the control parameter acquired by the control parameter acquisition circuitry.

12. The multi-axis control adjustment apparatus according to claim 9, wherein the adjustment operation execution circuitry is configured to perform the adjustment operations such that the adjustment operations start at substantially same timing and complete at substantially same timing with respect to the plurality of target axes, in a case where the adjustment operations are performed on the plurality of target axes based on the individual commands.

13. The multi-axis control adjustment apparatus according to claim 9, further comprising:
adjustment pattern setting circuitry configured to set an adjustment pattern of the control parameter alternatively to a first adjustment pattern when the plurality of target axes are mechanically constrained or to a second adjustment pattern when the plurality of target axes are not mechanically constrained,
wherein the adjustment operation execution circuitry is configured to perform the adjustment operations alternatively based on the common command when the first adjustment pattern is set or the individual commands when the second adjustment pattern is set.

14. A multi-axis control adjustment method comprising:
selecting a plurality of target axes among a plurality of axes each of which represents a combination of a motor and a motor control device configured to control the motor according to a control parameter of the motor control device;
performing adjustment operations in each of which the control parameter is adjusted with respect to each of the plurality of target axes;
changing, according to the adjustment operations, timing at which the control parameter is set with respect to each of the plurality of target axes; and
setting an adjustment pattern of the control parameter alternatively to a first adjustment pattern and to a second adjustment pattern,
wherein, when the first adjustment pattern is set, a first adjustment operation is performed based on a common command and the control parameters are set to a same first value when the first adjustment operation is executed, and
wherein, when the second adjustment pattern is set, a second adjustment operation is performed based on individual commands and the control parameters are set to a same second value with respect to the plurality of target axes after the second adjustment operation is completed.

15. The multi-axis control adjustment method according to claim 14, wherein the first same value is equal to the second same value.

16. The multi-axis control adjustment method according to claim 14, wherein the first same value is different from the second same value.

* * * * *